US005180275A

United States Patent [19]

Czech et al.

[11] Patent Number: 5,180,275

[45] Date of Patent: Jan. 19, 1993

[54] ROTARY BUS LIFT WITH POWER STOWABLE PLATFORM

[75] Inventors: Edward A. Czech, Winamac; Ronald W. Goodrich, Logansport; Kevin L. Crawford, Winamac, all of Ind.

[73] Assignee: The Braun Corporation, Winamac, Ind.

[21] Appl. No.: 706,583

[22] Filed: May 28, 1991

[51] Int. Cl.[5] .............................................. B60P 1/00

[52] U.S. Cl. .................................. 414/541; 414/540; 414/543; 414/921; 187/9 R

[58] Field of Search ............... 414/539, 540, 541, 542, 414/462, 670, 543, 545, 672, 556, 557, 668, 669, 921, 665, 666, 664; 187/9 R, 9 E

[56] References Cited

U.S. PATENT DOCUMENTS 3,182,826 5/1965 Mutto ................................ 414/541
3,638,813 2/1972 Strong .
3,847,292 11/1974 Williams et al. .
4,121,695 10/1978 Carpenter .......................... 187/9 R
4,251,179 2/1981 Thorley .......................... 414/921 X
4,479,753 10/1984 Thorley ............................ 414/541
4,664,584 5/1987 Braun et al. ......................... 414/541
4,685,858 8/1987 Manning et al. ............... 414/921 X
5,026,244 6/1991 Dorn ................................. 414/540

*Primary Examiner*—Frank E. Werner
*Attorney, Agent, or Firm*—Jacques M. Dulin; Thomas C. Feix

[57] ABSTRACT

Passive rotary wheelchair lift that is retrofittable in transit vehicles on either the forward or rearward edge of a side double-door step well. The lift employs in its preferred embodiment a double slide tube having a box frame with a cross header. A hydraulic cylinder actuates a pair of chains, one descending down each lift tube to operate the vertical lift. A manual hand pump is provided in the case of power failure. Secured to the bottom of inner telescoping lift tubes is a plate carrying a power actuator for rotating the lift platform from a deployed horizontal position to a vertical stowed position. In the stowed position the platform is approximately 26 inches in length and 36 inches in width. The platform has one or more slide-mounted extension sections which permit the platform to extend out to a full 51 inches. Manual or power-actuated wheel stops are provided at the rear entry and the forward end, for either one way or two way entry/exit onto the platform. Lockout circuitry prevents the actuators from rotating or stowing if the platform is not in its full raised position. Actuator clutch mechanism prevents the platform from being stowed if it is occupied. As installed, one of the double doors is openable permitting the stairwell to be used by an able-bodied person. The stowed platform is nested against a transit seat and remains behind the closed door half of the double-door pair. For use by a wheel chair user, both doors are opened and the lift is deployed, rotated and actuated to raise or lower the user to the ground, platform or curb. A special power actuating and ground contact locking plate is employed to permit the entry the entry wheelstop to be both power actuated and pivoted to the stowed position. The actuators can be disconnected for full manual operation in the event of power failure. A variety of lockout switches and circuitry is shown.

21 Claims, 6 Drawing Sheets

ROTARY BUS LIFT WITH POWER STOWABLE PLATFORM

FIELD

This application relates to improved wheelchair lifts, more particularly to a heavy duty, rotary, electric or hydraulic actuated, "passive" lifts for transit vehicles and private buses. By "passive" it is meant that the lift provides unrestricted entry by able-bodied persons through at least one door of a double entry/exit door of a transit vehicle by virtue of the lift platform being stowable behind the other door in a vertical position by an electric actuator mechanism. The lift may be deployed for use by wheelchair users upon opening both doors, and fully rotated to the exterior of the bus for lowering to the ground. Improved and strengthened lifting means involving a double slide tube with a header is employed.

BACKGROUND

The advantages of rotary wheelchair lifts for private vans is set forth in Braun et al U.S. Pat. No. 4,664,584 which discloses and claims the Braun L800 fully automatic Swing-A-Way® brand family of wheelchair lifts. The L800 lift is particularly suited for private usage as the same people will be using the lift over and over, so they will be familiar with the fact that the platform remains deployed at all times and may be traversed safely. A portion of the lift mechanism projects into the doorway and the platform is relatively small, having a single telescoping extension and automatic, pivoting front and rear roll stops. It also employs a fold-down handrail which, in the down position, secures the platform telescoping mechanism so that it does not move when stepped-on.

However, in a commercial transit vehicle environment, where the floor is higher off the ground, there is a stairwell entry, and seating is at a premium, such a continuously fully-deployed lift, which would overhang into the stairwell, would not be suitable. Further, it is not feasible to undertake the extensive education of the vast numbers of consumer riders on how to enter properly, including stepping on the platform to enter or exit.

Accordingly, there is a need for a heavy duty rotary lift for transit vehicles which is passive and fully power stowable, is electrically, hydraulically or manually actuable, and takes a minimum of floor space, yet meets the requirements of providing lifts for wheelchair users in public transport.

THE INVENTION

Objects

It is among the objects of the invention to provide an improved heavy duty passive rotary bus lift with a power stowable/deployable platform that can be positioned behind one door of a double-door side entry of a transit vehicle.

It is another object of the invention to provide an improved rotary transit lift which takes a minimum of floor space, permits close mounting to a passenger seat, and is electrically, hydraulically, electro-hydraulically or manually actuable in all or any selected number of its functions of lift, rotation and stowage.

It is another object of the invention to provide an improved platform support assembly that permits power stowage of the platform in a vertical position, yet the platform has double telescoping platform extension and power wheel stop features which permit it to accommodate all varieties of wheelchair and motorized tricycles.

Still other objects will be evident from the Summary, Description and Drawings.

DRAWINGS

The invention is described in more detail by reference to the drawings in which.

Figure 12A:
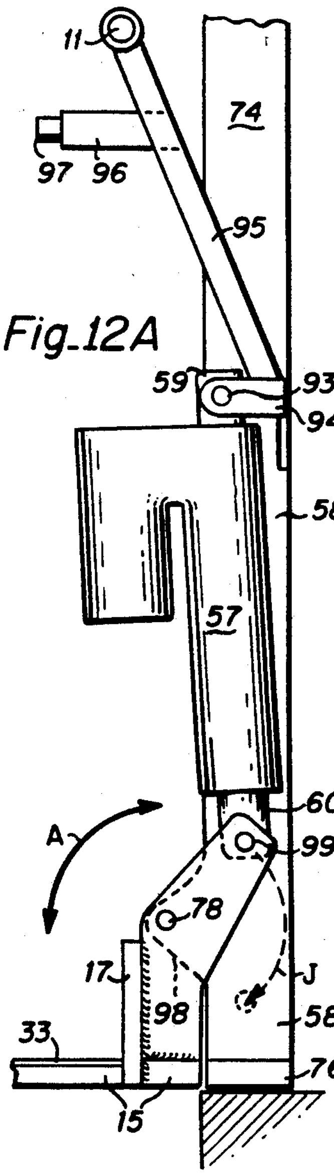
Figure 12B:
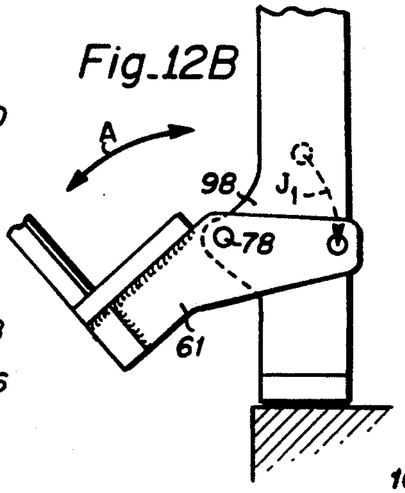
Figure 12C:
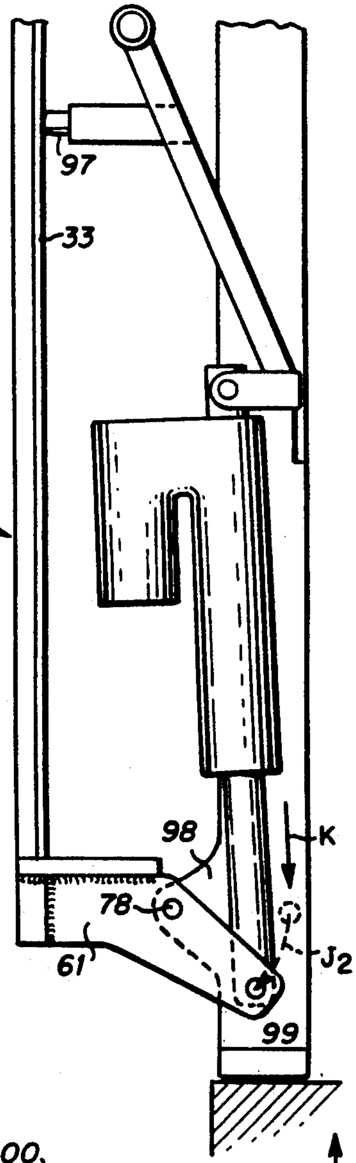
Figure 13:
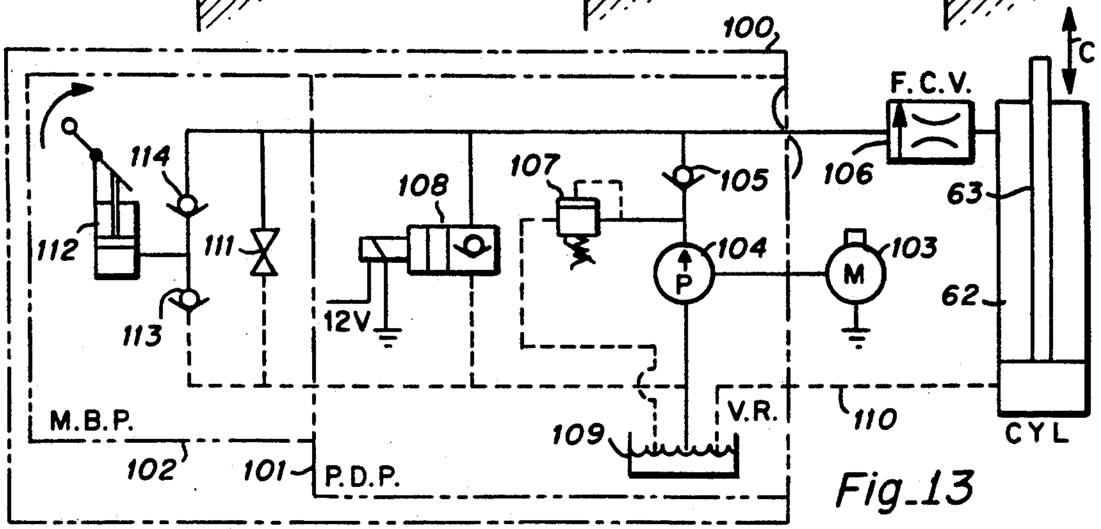

FIGS. **12*a*, 12*b* and 12*c* are a related series in side elevation showing the actuator mechanism for pivoting the platform from its deployed position in FIG. 12*a* to a 45° angle in FIG. 12*b*, and a fully stowed vertical position in FIG. 12*c***;

FIG. 13 is the hydraulic system schematic; and

Figure 14:
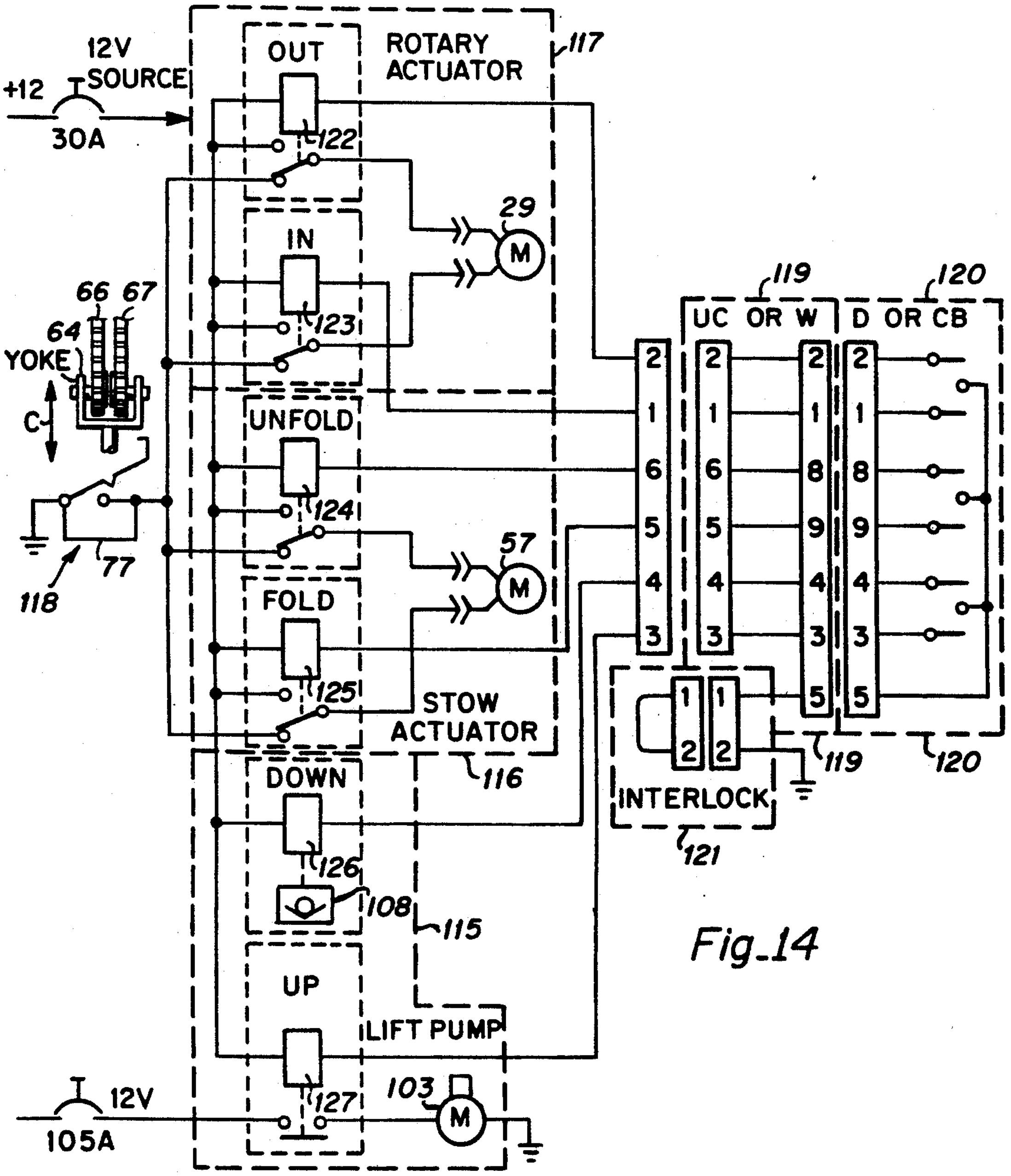

FIG. 14 is the electrical system schematic.

SUMMARY

The invention is directed to a rotary wheelchair lift, particularly suited for transit vehicles, such as city and inter city buses and rail to address the needs of disabled persons in accordance with the Americans with Disabilities Act Guidelines for Vehicular Transportation, 36 C.F.R. §1192. The lift is characterized as a heavy duty retrofittable lift which can be mounted on the vehicle floor in association with the pillar adjacent to a standard double entry/egress door, such as a standard Pellagram-type bus door, a bifold door, or a sliding entry/egress door of a commuter or transcontinental rail vehicle. By rail vehicle, we mean both light and standard rail, streetcar and the like. Reference herein to a "bus" is by way of example and is to be taken to mean any vehicular transport vehicle.

An important feature of this invention is provision for a power actuator means for stowing the platform, including both power lift and power deployment, from an initial stowed vertical position to a deployed horizontal position. In the stowed position, the lift tucks in behind the aft-most seat just forward of the rear entry/egress stairwell of the vehicle and projects only partially into the right half of the entry/egress stairwell (as seen from the exterior). For entry and egress by an able-bodied person, only the left door of the double doors is used. For use by a wheelchair user, both doors are opened, the lift is deployed and used through the entrance created by the open double doors. This stowability and use of one door by an able person makes the lift passive.

The lift is also a rotary lift so that the platform, after being deployed to the horizontal position, rotates from the interior, around a ninety degree arc to the exterior, and thence descends to the ground. For boarding the vehicle, the sequence is reversed. The power sequence for the platform lift is power up and gravity down. The lift is also powered both inwardly and outwardly during the rotational motion. As noted above, it is powered to both stow and deploy. An important feature is that the lift can be manipulated in all of its motions manually in the event of a power failure by uncoupling the power actuators and opening a relief valve in the hydraulics.

The heavy duty nature of the lift is accomplished through provision of a special box-frame dual slide-tube power lifting assembly and a pair of dual platform support arms. The platform itself is oversized, being a minimum of 32 inches at the forward extension of the platform and about 36½ inches wide in the rear fixed platform portion. The platform can telescope to a maximum of 51 inches longitudinally to provide the capability of receiving all known makes of wheelchairs and powered tricycles or four-wheel handicap personal assist vehicles. Since the length of such battery powered vehicles varies greatly, the provision of either a single or dual extension platform extending to over 50 inches is extremely important. Accordingly, the lift of this invention provides a universal sized platform that can accommodate any user. In addition, there is an inter-lock system so that the platform cannot rotate inwardly until it is at its uppermost horizontal (to the ground) position. Likewise, there is a special clutch mechanism in the power stowage actuator so that the platform cannot be stowed to the vertically upward position if the platform is occupied, even in the case of a child in a light weight manual wheelchair.

The platform is provided with wheel stops disposed at the aft entry and at the forward outboard end of the platform. The wheel stops may be manual or automatic. In one alternative, the entry wheel stop is manual and the forward wheel stop is a permanent fixed stop. In a second alternative, both stops may be manual spring-biased rising stops. In a third alternative, the forward outboard stop may be either manual or fixed, and the aft entry stop can be a power deploy-and-lift stop with a special ground contact latching mechanism which prevents deployment of the inboard entry stop until the platform is in the proper position (either on the ground or in contact with the bus floor on the interior). A special double-pivot powered stop actuator plate is provided so that the platform can be pivoted upward to the stowed position while still being engaged to the actuator plate. In the stowed position, the platform provides a shroud for the stowage mechanism which nests in the platform recess, protecting it from transit rider vandalism.

In another important embodiment, the telescoping extension and retraction of the platform sections may be either manual or powered. In the manual embodiment, either single or double extension sections are spring-biased to the retracted position. Thus, when the wheelchair or tricycle user boards the platform, the forward push of the entering wheel(s) against the front (outboard) stop plate extend the platform as the user boards the platform. Upon leaving the platform, the extensions automatically retract to the short retracted dimension (approximately 26"). In the powered embodiment, a motor is provided, preferably on the outside edge of the platform, which is connected by chain drive to a shaft underneath the platform. The shaft has mounted thereon several pinion gears which engage racks extending through slots in the platform floor. The platform extensions are mounted by drawer-type slider assemblies. Upon powering the motor, the rack-and-pinion drive extends the platform extension(s).

While the up-down lift mechanism is preferably hydraulically powered, it may be actuator powered. Likewise, the lift itself may be all hydraulic, or all electric actuator or a combination of both types of power drives. In all cases, the power drives have quick release pins so that the various power actuators, whether hydraulic or electric, may be disengaged for full manual operation in the event of an electric power, or hydraulic fluid, failure.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
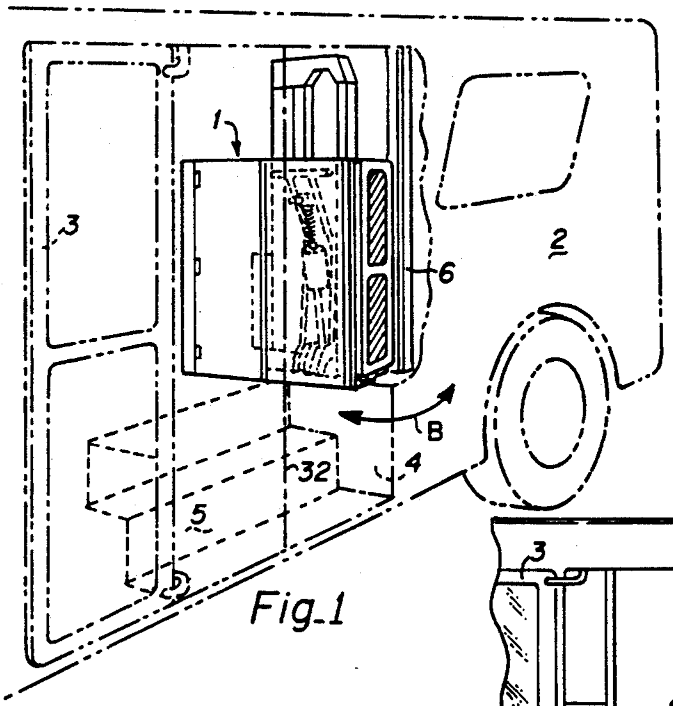
FIG. 1 shows in isometric projection, the rotary lift of this invention in the stowed position behind one of a pair of double doors of a transit vehicle, such as a bus or inter city train.

FIG. 1 illustrates the rotary transit lift 1 of this invention mounted in a bus, or inter city rail vehicle or other transit vehicle 2, in its platform-stowed position in association with a stairwell 5 which is accessible through a pair of doors 3 and 4, such as pellagram-type doors, folding doors or sliding doors. As shown, the left hand door 3 is open with the right hand door 4, shown in phantom, being closed. The lift mechanism is stowed behind the closed right hand door 4; with vertical line 32 representing the left edge of the door 4 as closed. The open left hand door by itself provides an approximately 28± inch wide opening for access to the stairwell 5 by able-bodied persons. However, when a wheelchair-bound person wishes to use the lift, both doors are opened and the lift is deployed and used.

Figure 2:
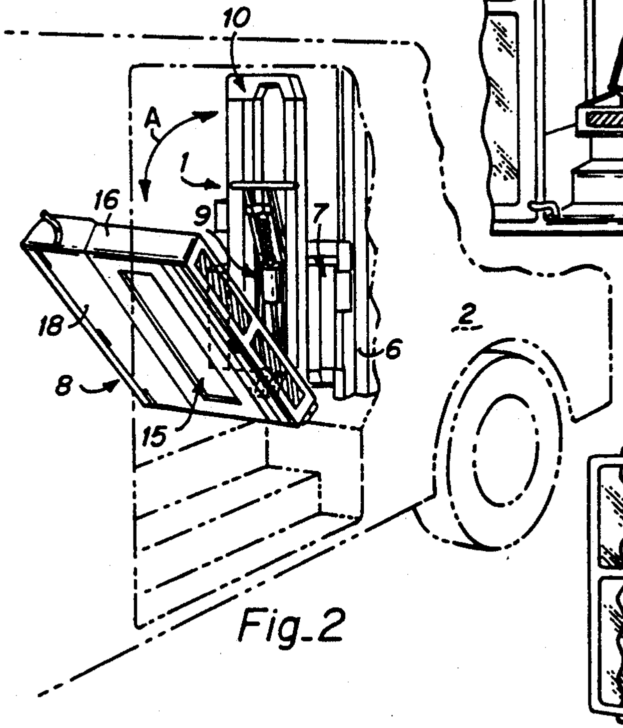
FIG. 2 shows the lift platform partially deployed.

FIG. 2 shows the platform assembly 8 in its partially deployed position. The lift 1 is mounted to vertical frame member 6 of the vehicle and comprises a platform assembly 8 which is pivoted from a horizontal deployed position to a vertical stowed position along one edge by a power stowage assembly 9 which is carried by the lifting assembly 10. The entire lift is mounted to the vehicle frame member 6 via pivot assembly 7 having a generally vertical pivoting axis. The platform itself has one or more transverse platform support arms 15 which carry the weight of the user on the platform sections which are mounted to the arms. The platform assembly 8 may comprise one or more plate members, such as rear plate 18, and has a pair of spaced parallel longitudinal side plates, outboard plate 16, shown in FIG. 2 and inboard plate 17 shown in FIG. 3. There are also a pair of transverse, vertically extending wheel stops, front wheel stop 12 shown in FIG. 3 and 4, and rear (entry) wheel stop 13 shown in FIG. 4.

Figure 3:
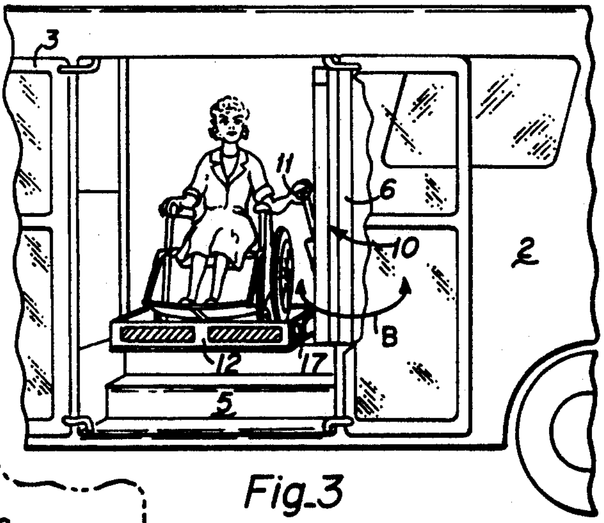
FIG. 3 shows the lift platform fully deployed with a wheelchair user on the platform just prior to being rotated from the interior of the vehicle outwardly.
Figure 4:
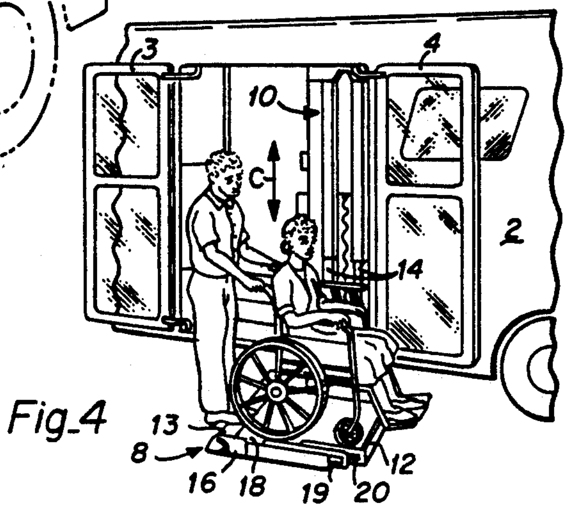
FIG. 4 shows the lift fully rotated out of the vehicle and lowered to the ground so that the user may leave the lift platform.

FIG. 3 shows a wheelchair user on the platform holding the handrail 11, ready to be rotated from the vehicle interior to the exterior prior to descending to the ground. FIG. 4 shows the lifting assembly having been rotated to the exterior, and the inner telescoping tube(s) 14 extended downwardly the fullest extent so that the platform assembly 8 contacts the ground. An attendant has his foot on the rear entry wheel stop 13 which rotates downwardly into contact with the rear platform plate 18 so the wheelchair can be rolled off the platform. It also shows the middle telescoping section 19 of the platform partially extended, as well as the forward telescoping section 20 partially extended. FIG. 4 also shows both of the vehicle doors, 3, 4 in their open position.

Figure 5:
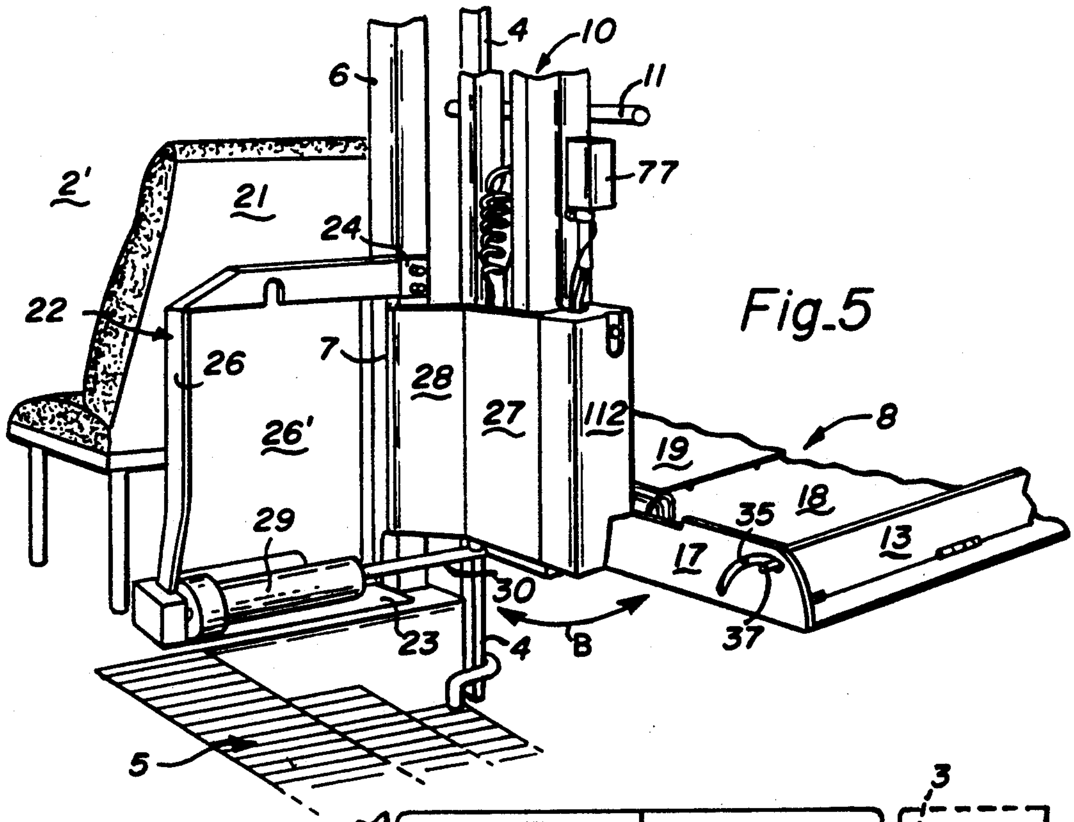
FIG. 5 shows an interior isometric view of the lift and its fully rotated position ready for descent.
Figure 6:
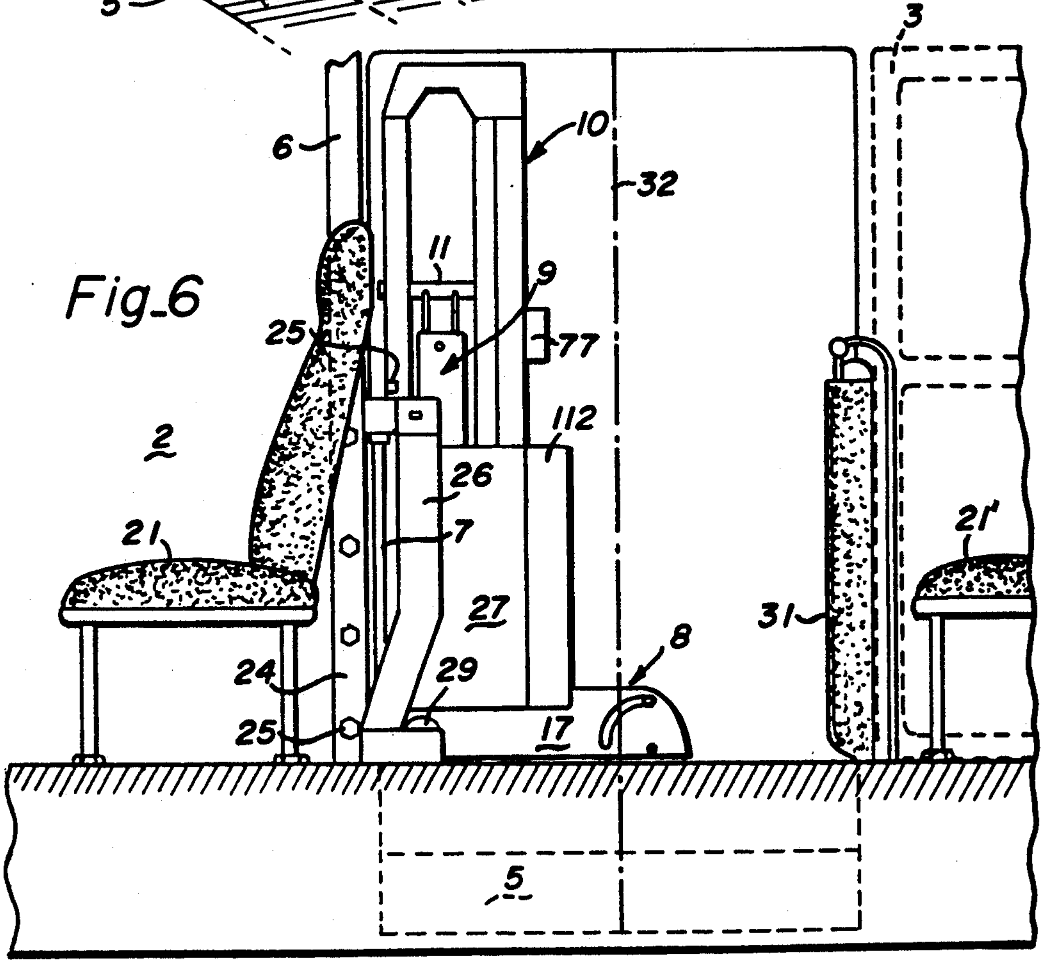
FIG. 6 shows an interior side elevation of the lift of FIG. 5 showing how the mounting mechanism of the lift accommodates the transit seat.

FIGS. 5 and 6 show details of the mounting assembly and powered pivoting mechanism. A transit seat 21 is shown in its standard position on the interior of the transit vehicle 2 . As best seen in FIG. 6, the mounting assembly fits snugly up behind the seat so as to take up a minimum of vehicle interior space. This mounting assembly includes a generally horizontal base plate 23, which is secured to the floor of the vehicle, and one or more vertical mounting plates 24 which are bolted at 25 to a vertical frame member 6. A housing 22 has suitable framing members 26 and cover plates 26[1]. The bridge plate 27 encloses the mechanism of the lift assembly 10. The lift assembly is mounted to, and pivots on, the vertical axle 7 via the angled vertical connector plate 28. A power drive mechanism 29, such as a linear actuator, is secured to the mounting plate 23. It rotates the lifting assembly to the platform assembly 8 via the actuator rod 30 from inboard to outboard and vice versa. Both FIGS. 5 and 6 show the lift from different perspectives rotated outwardly to the outboard position. FIG. 6 shows the standard transit modesty panel 31 forward of the first row of seats 21 , located behind the stairwell 5. FIG. 6 also shows the door 3 in phantom in its open position outside the vehicle. The dashed and dotted line 32 represents the meeting edges of the doors 3 and 4 where they come into contact when they are in their closed position.

Figure 7:
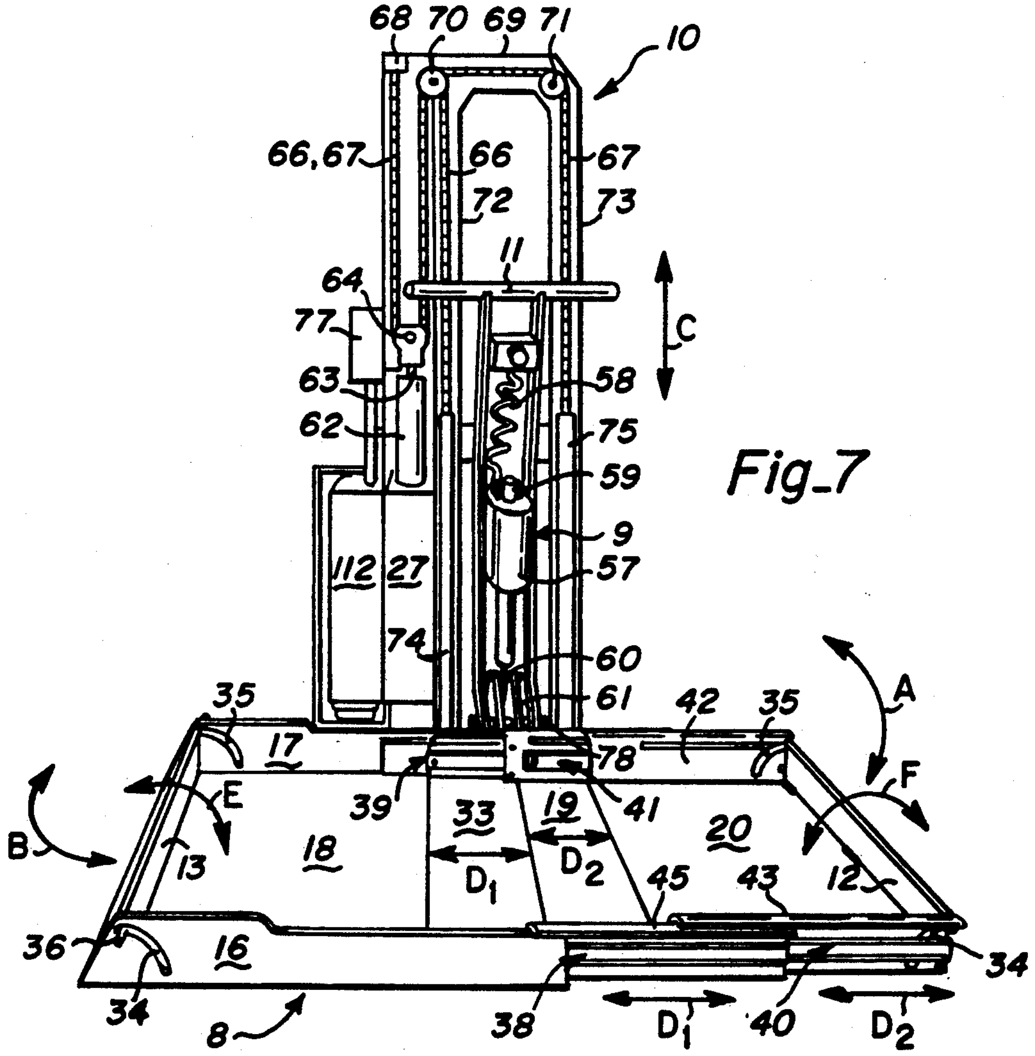
FIG. 7 is a perspective of the lift with the platform deployed showing details of the telescoping platform segments, the power lift assembly, and the power stow assembly.

FIG. 7 shows in perspective, the lift from the exterior after having been rotated and just prior to descending to the ground. The cover plates of the upper portion of the lift mechanism 10 have been removed to show the inner telescoping tubes and the lift cable or chain path.

First, as to the platform assembly 8, the platform transverse support arm(s) 15 (not shown) is (are) covered by a top plate 33 at the back end of which is attached the rear platform plate 18. In FIG. 7 the front or outboard portion of the platform is on the right, and the rear or inboard portion of the platform is on the left. The outboard longitudinal side plate is plate 16, and the inboard side plate is 17. As shown in this embodiment these two side plates each have at their rear (left) ends, arcuate slots 34 and 35, respectively, which function as guide slots for pins 36, 37, which pins are attached to the side ends of the spring-biased rear (entry) wheel stop plate 13. It should be understood that this wheel stop plate may also be a bridge plate for bridging larger gaps between the vehicle steps and/or the bus floor, or between the ground and the platform, or between the curb and the platform, as the situation may be.

As shown in FIGS. 4–7, the entry wheel stop in one embodiment is manually actuated by the attendant putting his or her foot on the pin 36 or 37 (or on the plate 13 itself) to depress it so the wheelchair can be rolled over it. Upon the release of the foot pressure, the plate 13 automatically springs back up to a vertical position forming the wheel stop to prevent the wheelchair from rolling off the platform. As is best seen in the embodiment of FIG. 4, the front stop plate 12 can be fixed to the forward telescoping section 20, or it may be spring-biased and pin-guided as shown in FIG. 7.

FIG. 7 also shows the various motions of the lift. The arrow marked A shows the motion of stowage of the platform. Arrow B shows the inboard to outboard rotation of the platform. Arrow C shows the vertical lift and descent motion. Arrow E shows the rotation of the rear stop plate 13, while arrow F shows the rotation of the front stop plate 12. Arrow $D_1$ shows the telescoping motion of the middle telescoping platform tray 19, while Arrow $D_2$ shows the telescoping motion of the forward telescoping tray, indicated as section 20 of the platform 8. These sections telescope on heavy-duty drawer-type slide assemblies 38 and 39 associated with the middle telescoping section 19, and slide assemblies 40 and 41 associated with the forward telescoping tray 20.

Figure 8:
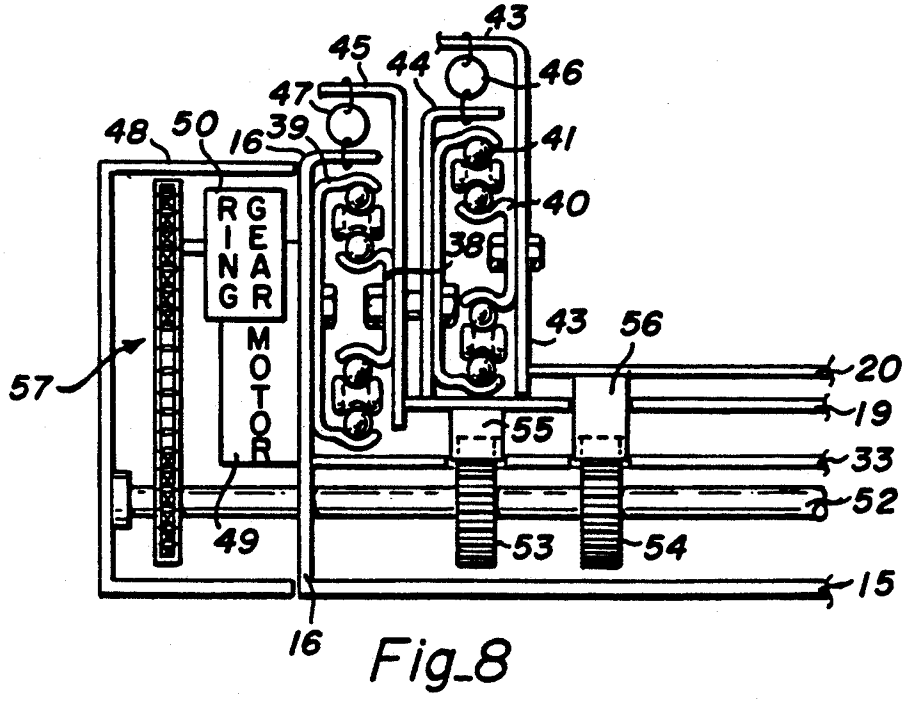
FIG. 8 shows in front elevation, the power telescoping mechanism for the multiple platform sections.
Figure 9:
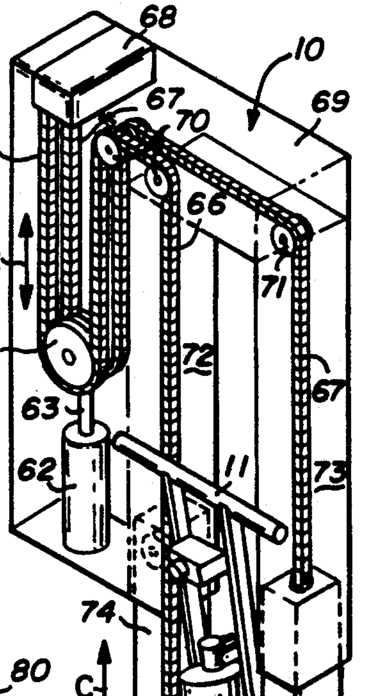
FIG. 9 shows in isometric view, the lifting chains and power stowage assembly connections to the platform pivot.
Figure 9:
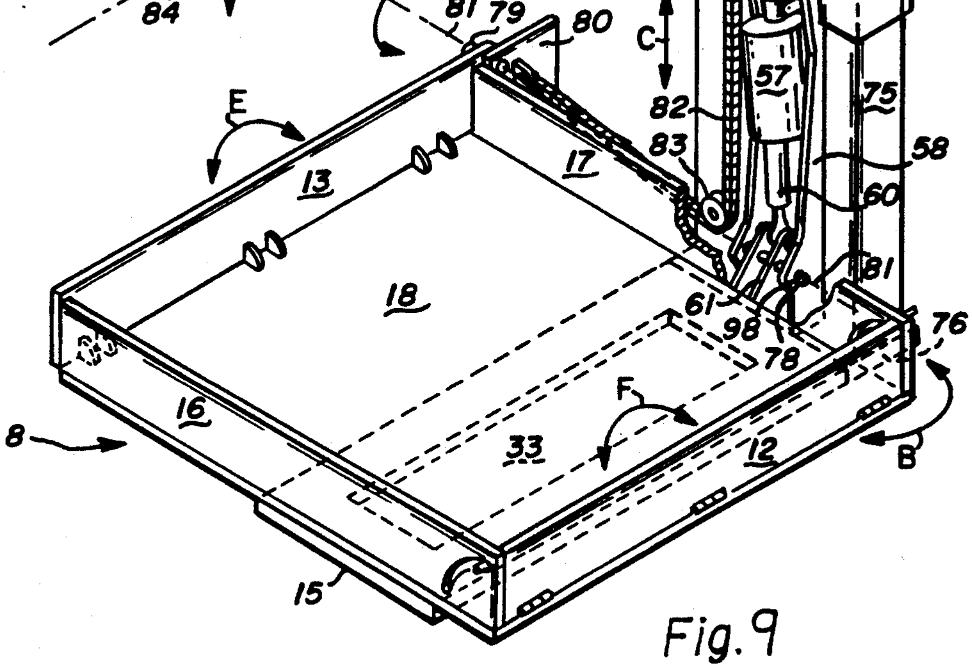

As best seen in FIG. 8, these trays 19, 20 are spring-biased to retract. They are pushed outwardly in their extended position by the forward motion of the wheelchair or battery powered tricycle of the handicapped user. This is best shown in FIG. 4. Upon the user exiting the platform, the tray extensions retract to the shorter closed position so they fit within the transit vehicle. While a single tray platform is shown in FIG. 9, and a triple tray platform is shown in FIG. 7, it should be understood that a double tray platform, that is, a platform having only one tray which extends, may also be employed. As shown in FIG. 7, the platform is approximately 32 inches in inner transverse dimension (inboard to outboard width) in the forward tray 20 and 36½ inches in width in the rear tray 18 (see FIGS. 1 and 2). The platform has a maximum extension of 51 inches. FIG. 7 shows the trays not quite fully extended.

As is shown in FIG. 8, either or both of the platform trays can be power-assisted for the extension and/or the retraction. Both are shown powered in FIG. 8. The forward tray 20 includes upstanding side walls 42, 43 (see FIG. 7), to which are attached the sliders, 40. They cooperate with the other half of the slide mechanism 41, which is secured to an inner side wall 44 of the middle platform 19. This platform also includes an outer side wall 45 associated with the inner side wall 44. To this outer side wall is attached the tray slide assembly 38 which engages the corresponding tray slide assembly 39. Tray slide assembly 39, in turn, is fastened to the inside of the upstanding side wall 16 which is also the outboard side plate of the tray sections 18, 33. These are spring-biased by springs 46, 47. A side housing 48 encloses a motor 49 having a ring gear 50 driven by the worm gear of the motor 49. Ring gear 50 is connected to a sprocket and chain drive assembly 51 which, in turn, drives the shaft 52 on which are mounted one or more pinon gears 53, 54 which engage racks 55, 56 secured to the underside of the mid-platform tray 19 and the forward platform tray 20, respectively. Typically, a 12 volt D.C. reversible window lift type motor can be employed to power the extension and/or retraction of the tray slide assemblies.

Returning to FIG. 7, the stowage mechanism 9 comprises a power lift 57 mounted on a bracket assembly 58, which in turn, is secured to the lower tubes 74, 75 of the lift assembly 10. This power means 57 may be a hydraulic or an electric actuator, such as a linear actuator or, preferably, a ball screw actuator having a built-in spring break which prevents back circulation of the ball so the platform will not unfold by gravity alone. It is a safety feature of the invention to prevent the platform from inadvertantly deploying due to vehicle motion-induced vibration. The upper end of the actuator includes a release pin 59 which permits the actuator to be disengaged from its mounting bracket so that, in the event of power failure, the lift can be deployed manually. Typically, the actuator 57 has approximately a 6 inch throw. It is mounted with the upper end of the actuator slightly outside a true vertical so that no overcenter binding position occurs. This is seen in more detail with reference to FIGS. 12*a*–12*c*. The lower end of the actuator includes a push rod 60 which engages a pivot plate 61, Which is secured to the side plate 17 and lift arm(s) 15 of the platform assembly 8. As the actuator pushes down, the platform is raised to the stowed position.

FIGS. 7 and 9 also show the power lift assembly 10 in detail. Housing 27 contains the electric and hydraulic circuitry and pumps for the lifting cylinder 62 which is preferably a hydraulic cylinder, but may be an electric linear actuator or ball screw actuator. The rod 63 terminates in a yoke 64 having a pulley 65 (see FIG. 9). A pair of chains or cables 66, 67 are secured at their upper ends to a header block 68 which is carried by the header member 69. The chains are draped in a U-shape through the pulley 65, and then back upwardly to a pair of idlers 70, 71 which redirect the chains so that chain 66 descends down the left leg 72 of the lifting assembly, and chain 67 descends down the right leg 73. As shown in FIG. 7, the chains terminate and are secured to the upper end of the inner telescoping tubes 74, 75, respectively. This is perhaps better seen in FIG. 9. The stow mechanism 9 is mounted on bracket plate 58, carried by the inner (lower) telescoping leg 74, 75 and the base plate 76. As noted, the "n" shape of the dual telescoping tubes, including the header 69, provides an extremely strong structure which permits repeated usages without rotational binding. As shown in both FIGS. 7 and 9, as the hydraulic cylinder 62 retracts the rod 63, the lift platform is raised by the lower tube 74 sliding into the upper outer tube 72, and tube 75 sliding in outer tube 73. The upper portion of the lift mechanism, including tubes 72 and 73, is carried by and secured to the pivot assembly 7 and mounting assembly 22–24 via plates 27 and 28 (FIG. 5).

FIG. 7 also shows the housing 77 for a microswitch which is contacted when the yoke 64 descends and contacts it. The microswitch is contacted only when the platform is in its fully raised position. Only then can the platform be rotated to the inboard position and the platform stowed in its vertically up position. This is described in more detail in connection with the electrical circuitry shown in FIG. 14.

Figure 10:
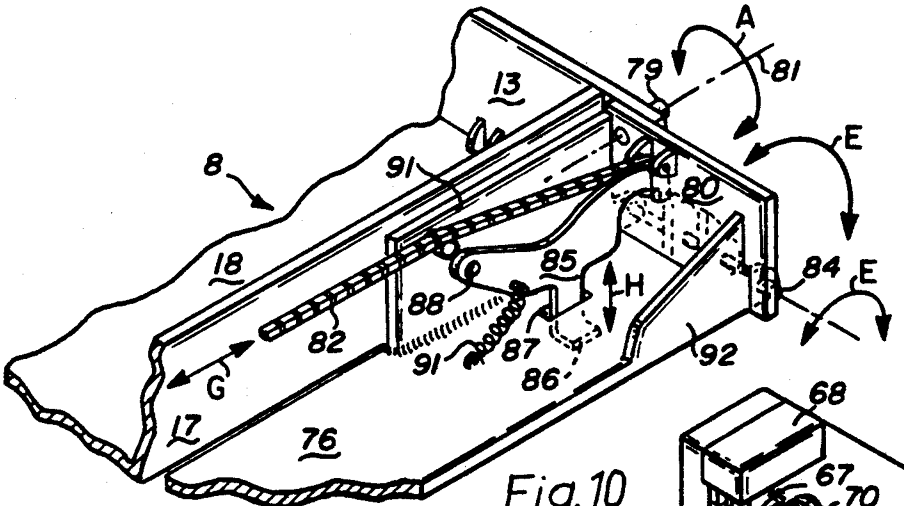
FIGS. 10 and 11 show isometric views of the ground contact release latch and the entry wheel stop lift and stow pivot mechanism.
Figure 11:
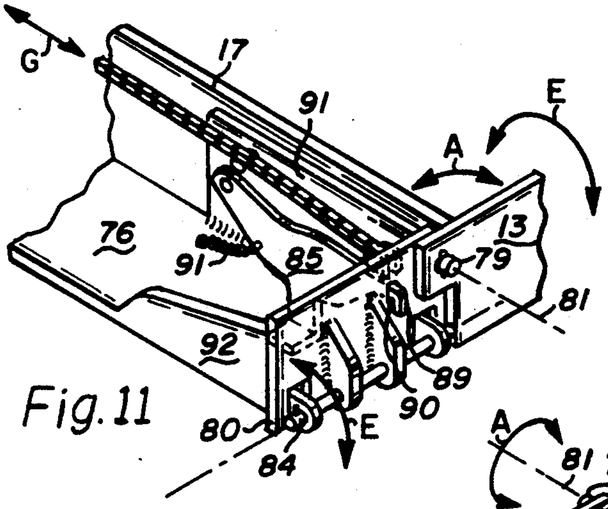

FIGS. 10 and 11 show isometric views of the powered automatic entry wheel stop operation, as well as the ability of the wheel stop to be pivoted along with the platform assembly 8 as it is pivoted upwardly to the stowed position. The base plate 76, to which the two inner telescoping arms 74, 75 of the lifting mechanism are secured, extends longitudinally rearwardly parallel to, but spaced from, the inboard side wall of the platform 17. The base plate 76 is not connected either to the platform arms 15 or to the upstanding inner side wall 17 of the platform; rather, these are connected to, a pair of spaced pivot plates 61.

It is important to note that the platform is pivoted around a horizontal axis 81 for purposes of stowage, which axis is located outside the confines of the platform. This axis 87 is defined by the shaft 78 which is carried by the mounting bracket 58 (see FIGS. 12*a* through 12*c* and FIG. 9). The pivot plates 61 are pivotally mounted on the shaft 78, which is also co-axial with the shaft-type pivot member 79, the stowage pivot between the wheel stop plate 13 and its power actuator plate 80. Because this common axis 81 is disposed outboard and above the plane of the platform 18, it is possible to not only power actuate the stop plate 13, but also pivot it at the same time the entire platform pivots to the stowed position.

As seen in FIGS. 9, 10, and 11, an extension 82 of chain 72 passes downwardly around a guiding lift roller 83 and longitudinally back to the actuator plate 80. Upon descent, when the arms 15 touch the ground, the hydraulic cylinder rod 63 continues to rise a bit, and the plate 80, which is spring-biased to open to the horizontal position, pivots on shaft 84 to a horizontal position. However, before it can do this, there must be positive contact with the ground. This is provided by locking plate 85 which has a foot member 86 extending through a slot 87 in plate 76. It is pivoted at one end on shaft 88. Thus, when there is positive ground contact the foot 86 is pushed upwardly as seen by arrow H.

This upward motion releases the tang 89 which projects through a slot 90 in the actuator plate 80. Then, upon relaxation of chain 82, the spring (not shown), provided either on shaft 84 or in conjunction with the hinges of plate 13 causes the actuator plate 80 and the wheel stop plate 13 (which is pinned thereto) to descend outwardly and downwardly to the ground, thus providing a ramp or bridge for access by the wheelchair user onto the platform 18. When the lift mechanism is actuated to lift the wheelchair user, the chain 82 first in a forward direction as shown by arrow G in FIGS. 10 and 11 and then upwardly as shown by arrows C in FIG. 9. This causes the actuator plate to rise, bringing with it the stop plate 13. The tang 89 on locking plate 85 passes through the slot 90 in plate 80 so that the tang lockingly engages the plate by virtue of the downward force exerted by spring 91. The side plates 92, 93 also act as stops to end the rotational motion E of the actuator plate 80.

FIGS. 12*a*–12*c* show the motion of the platform during the stowage. In FIG. 12*a*, the platform is in the fully deployed, horizontal position. The ballscrew actuator 57 is pivoted at its upper end on cross pin 93 carried by U-shaped bracket 94 mounted on the mounting bracket 58 which is secured at its base to the horizontal base plate 76. One of the two spaced, parallel lower telescoping member 74 is also shown. An angled extension 95 of the mounting bracket 58 carries both the user handhold 11 at its upper end, and a U-shaped mounting bracket 96, which itself carries at its outer end a rubber stop 97 which engages the platform plate 33 when the platform is in the vertical stowed position (best seen in FIG. 12*c*). The cross pin 93 permits the actuator 57 to rotate slightly during the lifting motion of the platform. As shown in FIG. 12*a*, the actuator is in its fully retracted position. The mounting bracket 58 also has a horizontal extension 98 which carries the shaft forming the platform stow pivot 78. The spaced pairs of pivot plates 61 are mounted on the pivot shaft 78. The shaft 60 of the actuator 57 is mounted to the upper end of dog-leg shaped pivot plates 61 by cross pin 99. Arrow J shows the position of the cross pin 99 through its full travel from the upper, deployed position to the lower, fully stowed position as best seen in FIG. 12*c*. FIG. 12*b* shows the platform partly stowed with the actuator being partly extended and the cross pin 99 moving in the arcuate path $J_1$. FIG. 12*c* shows the actuator shaft 60 fully extended, having moved outwardly as shown by the arrow K, and the cross pin 99 having moved from the position shown in FIG. 12*b* down to its lowermost position as shown by the dashed arrow $J_2$. Note also in this position the actuator 57 and handrail 11 are completely nested within the platform 8. Thus, the platform provides a housing in its stowed position which tends to inhibit transit rider vandalism to the mechanism. As shown in FIGS. and 6, there is also housing 22 including frame 26 and panel $26^1$ which, in combination with the stowed platform 8, forms a complete box around all of the lift operating mechanisms. Thus, the enclosed lift mechanism, while in the stowed position, discourages vandalism. Further, the mechanism is highly safe in that there are no exposed lifting cables or chains, they being completely enclosed within the telescoping tubes 72–75.

FIG. 13 shows a schematic of the hydraulic system 100, including the Power Driven Pump circuit 101 (indicated as "PDP" in FIG. 13) and the auxiliary Manual Backup Pump circuit 102 ("MBP"), to actuate the lift hydraulic cylinder 62, having, as shaft 63 a carrying yoke 64 (see FIGS. 7 and 9). A 12 volt DC motor 103 powers pump 104 to pump the hydraulic fluid through high pressure check valve 105 and flow control valve 106 to the shaft side of the cylinder piston. This causes the shaft 63 to descend and the lift to rise. The circuit also includes an adjustable pressure relief valve 107 and a solenoid operated check valve 108 for the gravity-down function. Once the check valve 108 is open, the hydraulic fluid exits the cylinder through the flow control valve, passes through the check valve 108 and then to the vented reservoir 109. Line 110 represents an air vent for the piston side of the cylinder.

In the event of power failure, the Manual Backup Pump section 102 may be employed. The manual release valve 111 is opened, and hydraulic fluid can then flow through flow control valve around the circuit through valve 111 and thence to the reservoir 109. To raise the lift, the valve 111 is closed, and the hand pump 112 is actuated, drawing fluid from the reservoir 109 via the inlet check valve 113, through high pressure check valve 114, and thence through the flow control valve 106 to the rodside of the cylinder 62. The lift operates as if powered, but somewhat more slowly.

FIG. 14 shows the electrical circuitry schematic, including: the lift pump circuit section 115; the stow actuator circuit 116; the rotary actuator circuit 117; the yoke microswitch lockout section 118; the wiring or umbilical cable segment 119; the dashboard switches or hand held control box containing rocker switches 120; and one or more safety interlocks 121 (such as door air locks, ignition off interlock, security lock, emergency kill switch, brake off, parking brake on, engine on, engine off, etc).

The various motors and actuators 29, 57 and 103, microswitch 77 and yoke 66 are cross referenced in FIG. 14 to the numbers of those elements in other FIGURES so that the operational control is evident from a study of this circuitry. The rotary actuator circuit 117 and stow actuator circuit 116 each employ pairs of 30 amp single pole, double throw relays to reverse polarity to the motors. One pair is used for each actuator, the stowing actuator motor 157 and the rotary actuator 29. Note also the microswitch circuit 118 wherein the microswitch 77 must be contacted by the yoke 64 upon full retraction of the cylinder rod 62 which produces the full rise of the lift platform 8. Unless this occurs, both the stow actuator and rotary actuator circuits are disabled and cannot function. Only when the microswitch is closed by full retraction of rod 62 and yoke 64 can there either be rotation either into or out of the vehicle or stowage of the platform. The microswitch 77 is mounted on the slide tube frame, and is completely enclosed so it cannot be tampered-with.

The wiring 119 represents an umbilical cable that may be connected directly to the unit at one end and to a hand held control box at the other end. Thus, the attendant shown in FIG. 4 can manipulate the control box from the umbilical, either inside or outside the vehicle separate from the motorman. Alternately, the rocker switches or toggle switches of the control 120 may be located at the vehicle dashboard or in a special lockable control panel accessible in the vehicle or from the exterior of the vehicle.

Upon actuation of switch 3 in the control box 120, the solenoid 127 is activated closing the contact for the lift pump motor 103. The lift is then powered to the up position. Upon activation of the rocker switch in the opposite direction to position 4, the solenoid 126 is activated and the check valve 108 opens permitting the lift to go to the down position by gravity.

Preferably, the stow actuator 57 has an internal torque-limiting clutch to prevent stowing an occupied platform. For example, the actuator typically develops 1600 pounds torque, but once the platform contains 80 pounds or more of weight, the platform would not be enabled to stow. This would be the weight of a child on a manual wheelchair. Further, the provision for the front wheel stop fold down permits two way entry and exit. The lift of this invention does not require vehicle modifications, it being completely retrofittable. The passive design (meaning that the lift stows out of the way) is an important feature as it does not block able-bodied users from using the same entry and exit door. The lift can be entirely operated manually in the event of power failure. The actuator 29, for example, may also have a release pin at its motor end or at the shaft end so that it can be disengaged and the platform manually rotated into and out of the vehicle. Rather than a hydraulic or ball-type linear actuator, an Acme screw-type threaded screw with traveling nut may be employed. The entire lift is heavy duty, by virtue of the double slide tube comprising an upper box frame with a header in a horseshoe or n-shaped telescoping arrangement which reduces torsional or misalignment binding. While cable lifting may be employed, we prefer the use of chains as there is less use-induced stretching which would require additional and continuous adjustments.

It should be understood that various modifications within the scope of this invention can be made by one of ordinary skill in the art without departing from the spirit thereof. For example, one or more shielded, threaded yoke(s), traveling on vertical rotating threaded rod(s) can be used to power the vertical lift motion. The lift is shown mounted on the right side of the stair well, but can be mounted on the left. We therefore wish our invention to be defined by the scope of the appended claims in view of the specification as broadly a the prior art will permit.

We claim:

1. A passive rotary wheelchair lift for retrofit adjacent an entry/exit stair well of a transit vehicle comprising in operative combination:
a) a lift platform assembly which includes:
i) a generally planar platform having a first, longitudinal axis, and a second, transverse axis;
ii) at least one support arm disposed parallel to said transverse axis and beneath said platform to support said platform;
iii) a pivotable rollstop disposed to pivot from a generally vertical position to a generally horizontal position to permit entry of said wheelchair user onto said platform, said rollstop being disposed generally parallel to said transverse axis and at one end of said platform;
iv) a pair of spaced side walls oriented parallel to the longitudinal axis of said platform and disposed on opposed longitudinal sides of said platform;
b) means for lifting and lowering said platform disposed adjacent one of said longitudinal sides of said platform to permit said platform to be raised and lowered between a first, vehicle floor level to a second, lower level;
c) said platform being pivotally connected about an offset axis adjacent a lower end of said lifting means so that said platform can be stowed in a generally vertical position;
d) means for rotationally supporting said lifting means along a generally vertical axis;
e) power means for rotating said lifting means and said platform from a first inboard position within said vehicle to an outboard position external of said vehicle with the wheel chair thereon so that said platform can be lowered to the ground;
f) means for mounting said lift in said vehicle;
g) means for powered rotation of said platform along a generally horizontal axis between a first generally horizontal deployed platform position to a second, generally vertical passive stowed platform position, said platform power stowage means being connected between said platform and said lifting means, said platform power stowage means being carried by said platform lifting means; and
h) in combination, said lift in its stowed configuration permitting able bodied use of said stairwell, and wheel chair use when deployed into said stairwell.

2. A passive rotary transit lift as in claim 1 wherein:
a) said lifting means comprises a pair of spaced telescoping members, and a vertically oriented means for actuating at least one flexible connector to move said telescoping members vertically between said raised and lowered positions.

3. A passive rotary transit lift as in claim 2 wherein:
a) said platform power stowage means comprises an actuator assembly disposed to engage a lever mechanism to pivotingly rotate said platform from said deployed to said stowed positions and vice versa.

4. A passive rotary transit lift as in claim 3 wherein:
a) said entry rollstop includes means for power actuation.

5. A passive rotary transit lift as in claim 4 wherein:
a) said rollstop power actuation means includes an actuator plate connected to said rollstop by a pivot member having an axis coordinate with said horizontal axis of said platform rotation power stowage means so that said rollstop is both power actuable and pivotable with said platform to the vertical stowed position.

6. A passive rotary transit lift as in claim 5 wherein:
a) one of said lifting means flexible connectors is extended to said actuator plate so that upon pulling said extension, said rollstop is lifted to a vertical stop position prior to said platform being raised off the ground.

7. A passive rotary transit lift as in claim 6 wherein:
a) said rollstop includes a locking plate which is releasable only upon near contact by said platform with a surface.

8. A passive rotary transit lift as in claim 3 wherein:
a) said platform power stowage and lifting means are each disconnectable for manual operation upon loss of power.

9. A passive rotary transit lift as in claim 8 wherein:
a) said lift is mounted in said transit vehicle in association with a double entry door pair, one of said doors of said pair being adapted to selectively remain closed to permit access by an able bodied person selectively through said other door of said pair, and both doors of said pair being selectively openable for deployment and use of said lift by a disabled person.

10. A passive rotary transit lift as in claim 8 wherein:
a) said mounting means includes panels adapted to enclose said lift mechanism to inhibit transit rider vandalism.

11. A passive rotary transit lift as in claim 4 wherein:
a) said power stowage means includes a ball screw actuator having a spring brake to prevent back circulation of balls so said platform will not unfold by gravity.

12. A passive rotary transit lift as in claim 11 wherein:
a) said platform power stowage means prevents stowing said platform when occupied with a predetermined fixed weight.

13. A passive rotary transit lift as in claim 12 wherein:
a) said platform power stowage means nests in said platform in the stowed position.

14. A passive rotary transit lift as in claim 3 wherein:
a) said platform includes at least one tray slide mounted to said longitudinal side walls, which tray is movable from a first retracted position to a second extended position to increase the longitudinal dimension of said platform.

15. A passive rotary transit lift as in claim 14 wherein:
a) said platform includes two slide mounted trays, one mounted to said longitudinal side walls, and a second mounted in a first tray.

16. A passive rotary transit lift as in claim 15 wherein:
a) said platform includes a front rollstop.

17. A passive rotary transit lift as in claim 16 wherein:
a) said front rollstop is fixed.

18. A passive rotary transit lift as in claim 16 wherein:
a) said front rollstop is pivotable to permit user entry/exit.

19. A passive rotary transit lift as in claim 16 includes:
a) a hand-held control box on an umbilical for controlling the operation of said lift by an attendant.

20. A passive rotary wheelchair lift mounted in a transit vehicle comprising in operative combination:
a) a lift platform assembly which includes:

i) a generally planar platform having a first, longitudinal axis, and a second, transverse axis;

ii) at least one support arm disposed parallel to said transverse axis and beneath said platform to support said platform;

iii) a pivotable rollstop disposed to pivot from a generally vertical position to a generally horizontal position to permit entry of said wheelchair user onto said platform, said rollstop being disposed generally parallel to said transverse axis and at one end of said platform;

iv) a pair of spaced side walls oriented parallel to the longitudinal axis of said platform and disposed on opposed longitudinal sides of said platform;

b) means for lifting and lowering said platform disposed adjacent one of said longitudinal sides of said platform to permit said platform to be raised and lowered between a first, vehicle floor level to a second, lower level;

c) said platform being pivotally connected about an offset axis adjacent a lower end of said lifting means so that said platform can be stowed in a generally vertical position;

d) means for rotationally supporting said lifting means along a generally vertical axis;

e) power means for rotating said lifting means and said platform from a first inboard position within said vehicle to an outboard position external of said vehicle with the wheel chair thereon so that said platform can be lowered to the ground;

f) means for powered rotation of said platform along a generally horizontal axis between a first generally horizontal deployed platform position to a second, generally vertical passive stowed platform position, said platform power stowage means being connected between said platform and said lifting means, said platform stowage means being carried by said platform lifting means; and g) means for mounting said lift to the floor of said transit vehicle adjacent a stairwell, so that said lift in its stowed configuration permits able bodied use of said stairwell and wheel chair use when deployed into said stairwell.

21. Passive rotary wheelchair left as in claim 20 wherein;

a) said lift is mounted in said transit vehicle in association with a double entry door pair which provides ingress and egress through said stairwell; and which includes:

b) means for selectively maintaining one of said doors of said pair closed and the other operable for access by an able bodied person selectively through said other door of said pair, and for selectively opening both of said doors of said double entry door pair for deployment and use of said lift by a disable person.

* * * * *